United States Patent
Henocque (10) Patent No.: US 10,262,026 B2
(45) Date of Patent: Apr. 16, 2019

(54) RELATIONAL FILE DATABASE AND GRAPHIC INTERFACE FOR MANAGING SUCH A DATABASE

(71) Applicants: UNIVERSITE D'AIX-MARSEILLE, Marseilles (FR); CENTRE NATIONAL DE LA RECHERCHE SCIENTIFIQUE, Paris (FR)

(72) Inventor: Laurent Henocque, Marseilles (FR)

(73) Assignees: UNIVERSITE D'AIX-MARSEILLE, Marseilles (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 330 days.

(21) Appl. No.: 15/310,847

(22) PCT Filed: May 11, 2015

(86) PCT No.: PCT/FR2015/051225
§ 371 (c)(1),
(2) Date: Nov. 14, 2016

(87) PCT Pub. No.: WO2015/173500
PCT Pub. Date: Nov. 19, 2015

(65) Prior Publication Data
US 2017/0091260 A1 Mar. 30, 2017

(30) Foreign Application Priority Data
May 12, 2014 (FR) .................................. 14 54205

(51) Int. Cl.
*G06F 17/30* (2006.01)
*G06F 3/0481* (2013.01)

(52) U.S. Cl.
CPC ...... *G06F 17/30371* (2013.01); *G06F 3/0481* (2013.01); *G06F 17/3012* (2013.01);
(Continued)

(58) Field of Classification Search
CPC .......... G06F 17/30126; G06F 17/3012; G06F 17/30129; G06F 17/3023
See application file for complete search history.

(56) References Cited

U.S. PATENT DOCUMENTS 7,028,031 B1* 4/2006 Rehfeld ............ G06F 17/30882
7,072,893 B1* 7/2006 Rehfeld ............ G06F 17/30887
(Continued)

FOREIGN PATENT DOCUMENTS

WO 2004/070629 A2 8/2004

OTHER PUBLICATIONS

Jul. 31, 2015 Search Report issued in International Patent Application No. PCT/FR2015/051225.
(Continued)

*Primary Examiner* — William Spieler
(74) *Attorney, Agent, or Firm* — Oliff PLC (57) ABSTRACT

The present invention relates to a method for displaying a graphical interface having display areas including a reference area, wherein each file of a file set is displayed in the form of an icon in one of the display areas, and each file of the file set contains a unique identifier identifying the file, and processing a command for inserting into the file set a selected pre-existing file which does not belong to the file set, the processing of the insertion command including the steps of: generating a new file in the file set, from the content of the selected pre-existing file, generating a unique identifier identifying the new file, and inserting into the new file the generated unique identifier and a reference link generated from a file identifier corresponding to each icon located in the reference area.

15 Claims, 4 Drawing Sheets

(52) U.S. Cl.
CPC .... *G06F 17/3023* (2013.01); *G06F 17/30109* (2013.01); *G06F 17/30126* (2013.01); *G06F 17/30129* (2013.01); *G06F 17/30572* (2013.01)

(56) References Cited

U.S. PATENT DOCUMENTS

| | | | | |
|---|---|---|---|---|
| 7,720,823 | B1* | 5/2010 | Rehfeld | G06F 17/30882 707/691 |
| 7,882,082 | B2* | 2/2011 | Rehfeld | G06F 17/30887 707/689 |
| 8,001,083 | B1* | 8/2011 | Offer | G06F 8/61 707/636 |
| 8,171,141 | B1* | 5/2012 | Offer | G06F 9/5077 709/223 |
| 8,347,263 | B1* | 1/2013 | Offer | G06F 8/71 717/104 |
| 8,577,937 | B1* | 11/2013 | Offer | G06F 8/61 707/821 |
| 9,015,180 | B1* | 4/2015 | Offer | G06F 17/301 707/758 |
| 2003/0144858 | A1* | 7/2003 | Jain | G06Q 10/06 705/1.1 |
| 2006/0230050 | A1* | 10/2006 | Rehfeld | G06F 17/30887 |
| 2007/0260643 | A1* | 11/2007 | Borden | G06F 17/30097 |
| 2014/0040328 | A1* | 2/2014 | Offer | G06F 17/3007 707/821 |
| 2015/0046463 | A1* | 2/2015 | Mohan | G06F 17/30619 707/741 |
| 2016/0357541 | A1* | 12/2016 | Offer | G06F 17/3007 |

OTHER PUBLICATIONS

Nov. 15, 2016 International Preliminary Report on Patentability issued in International Patent Application No. PCT/FR2015/051225.

Aquafolds, Inc.; "Aqua Data Studio version 15.0;" Programme D'Ordinateur; Apr. 23, 2014; Query Builder.

Anonymous; "What's New in Version 15.0 (Revision #25): New Features-Version 15.0: Aqua Data Studio;" Apr. 23, 2014; XP055164961; Retrieved from the internet: URL: https://www.aquaclusters.com/app/home/project/public/aquadatastudio/wikibook/New -Features-15.0/page/0/What-s-New-in-Version-15-0/revision/25.

AquaFolds, Inc.; Aqua Data Studio Version 15.0—Visual Query Builder (Advanced feature demonstration); URL:http:/www.aquafold.com/tutorial/query_builder_advanced_demo/query_builder_advanced_demo.ogv; accessed on Jan. 26, 2015.

Apple Inc.; "iTunes, version 11.0.1;" Programme D'Ordinateur; Dec. 13, 2012.

Anonymous; "iTunes version history—Wikipedia, the free encyclopedia;" Jan. 19, 2015.

AquaFolds, Inc.; Aqua Data Studio Version 15.0—Visual Query Builder Basic feature demonstration); URL:http:/www.aquafold.com/tutorial/query_builder_basic_demo/query_builder_basic_demo.ogv; accessed on Jan. 26, 2015.

* cited by examiner

RELATIONAL FILE DATABASE AND GRAPHIC INTERFACE FOR MANAGING SUCH A DATABASE

The present invention relates to a system for organizing files.

Currently, files are stored in data storage units (hard drive, USB drive, CD-ROM, DVD) accessible directly or through a local or public network (internet). Such data is generally organized as a file system in which the data is distributed in files grouped in folders or directories that may be nested. When they are not managed by a dedicated software program, for example an electronic document management system, the files are generally grouped in folders or directories that may be nested and thus made available to the user. The file systems generally offer opening, saving, copying, moving, or deleting functions, from an access path made up of a file name preceded by a list of nested directory names or an URL (Uniform Resource Locator) address.

Such a file system enables large amounts of data to be processed and stored, and shared between several computer programs and several users. It provides the users with an abstract view of the files they can locate from an access path. Therefore, the file systems enable data contained in the stored files to be accessed and provide an elementary means of managing such data. In any case, the information used to define the organization of these files is external to the files, and is managed by the operating system of the computer, or by a specific application (electronic document management). The result is that such organizational information is not available for transmission with a file when the file is sent to a remote recipient.

File systems are generally simple to use, but offer organizational possibilities limited to a tree structure. Therefore, the only way to establish a link between two files is to place them in a same directory. Generally speaking, file systems do not enable links to be established between files that may be stored in different directories. If a file is stored by mistake in, or moved to a given directory, it loses its link with the other files of the directory in which it should have been stored, and thus becomes more difficult to find. It is also possible to define links with other files within a file. Thus, languages such as HTML or XML may define such links, each including the access path and a file name. However, if the target file of the link is moved (to another directory) or renamed, the link no longer enables access to this file. File systems do not enable the origin and author of a file to be reliably determined either. Generally, file systems do not enable either to determine prima facie (without using a comparison tool) whether or not two files are identical.

To search for a file, or more generally for a piece of information, a search engine is often used with the user entering one or more keywords that might be contained in the name, address or content of a file. To speed up such a search, the files (on a hard drive or on the Internet) may have been indexed by an indexing engine. Such indexing involves grouping in index tables the names and addresses of files as well as keywords, so that a search can be carried out in these tables rather than throughout the entire contents of a directory tree structure or of the files within such a directory tree structure. Keywords in natural language may have little discriminant value and fail to allow a specific file to be found.

There are other data organization systems, such as databases, in particular relational databases. These databases enable a set of different types of information to be stored and found, and links to be established between the different stored items of information. Databases are generally associated with a management system including computer programs for handling and accessing data, and also handling the structure of the database. In relational databases, data is stored in tables including records linking several data items that may be stored in different tables. Databases prove to be complex to implement and use, and they require specific knowledge and tools, in particular to define the data to be accessed and to define and modify the structure of the database and the tables. To access data it is also necessary to know the structure of the database, and in particular the structure of each of the tables of the database. Databases also prove to be sensitive, in particular to the loss or corruption of a table.

Furthermore, graphical interfaces have been developed to facilitate access to data stored in a database or on the Internet. Some of these graphical interfaces enable graphical definition and generation of access requests in which criteria or keywords are combined by Boolean operators such as OR, AND, NOT. The use of such an interface and the definition of requests also require specific knowledge, in particular of the structure of each of the tables in the database.

It may therefore be desirable to provide tools allowing data to be easily organized, without using a complex and costly database management system or a specific file system, and without requiring any specific knowledge, in particular concerning the content or internal structure of the files. It may further be desirable to propose a system for organizing files that is scalable, adaptable and shareable between several users. It may also be desirable for this file organization system to be independent of a specific data storage infrastructure, while offering the possibility of storing organizational information of a file set independently of the physical location of the files. It may further be desirable to provide an ergonomic graphical interface to build and use files in a file system. It may further be desirable to facilitate file searches. It may further be desirable to easily determine whether two files are identical, even if they are consulted by two remote persons. It may further be desirable to check that the integrity of a file has not been altered, even if it originates from a remote source.

Some embodiments relate to a method for managing a file set, comprising steps of: displaying a graphical interface comprising display areas including a reference area, wherein each file of a file set is displayed in the form of an icon in one of the display areas, and each file of the file set includes a unique identifier identifying the file, and processing a command for inserting into the file set a selected pre-existing file which does not belong to the file set, the processing of the insertion command comprising the steps of: generating a new file in the file set, from the content of the selected pre-existing file, generating a unique identifier identifying the new file, and inserting into the new file the generated unique identifier and a reference link generated from a file identifier corresponding to each icon located in the reference area.

According to one embodiment, the file identifier and any reference links are inserted into the new file without affecting the way the content of the pre-existing file located in the new file may be used.

According to one embodiment, each file icon displayed in the graphical interface represents all the possible copies of a file having a same identifier, independently of a storage area in which a copy of the file may be stored.

According to one embodiment, the method comprises a step of inserting into the file set, a link file for linking two files, when two file icons present in a favorite files area of the display areas are stacked, the link file including a unique identifier identifying the link file and a double reference link including the identifier of each file corresponding to the two stacked icons.

According to one embodiment, the method comprises steps of: searching for a location for inserting an identifier into the new file, by means of a tag, calculating a digital fingerprint by applying a fingerprint calculation function to the new file, the calculated fingerprint having a value based on each of the bits of the new file, and inserting the fingerprint at the insertion location found in the new file, the fingerprint serving as an identifier of the new file.

According to one embodiment, the use of a file of the file set is preceded by integrity checking steps of: calculating a digital fingerprint by applying a fingerprint calculation function to the file to be used, the calculated fingerprint having a value based on each of the bits of the new file except for the bits of the identifier of the file to be used, contained therein, and comparing the calculated fingerprint with the identifier of the file to be used, the integrity check of the file to be used being successful if the calculated fingerprint corresponds to the identifier of the file to be used, the use of the file to be used only being authorized if the integrity check of the file to be used was successful.

According to one embodiment, the method comprises steps of searching for a copy of the file to be used and of checking the integrity of the found file copy, if the integrity check of the file to be used failed.

According to one embodiment, the new file contains an identifier of a profile file assigned to the user who issued the command for inserting the new file into the file set.

According to one embodiment, the method comprises steps of: displaying in the graphical interface a criterion area and a result area among the display areas, activating a search for files in the file set upon placing in the criterion area an icon corresponding to a file of the file set, the search using a search criterion generated from the identifier of each file corresponding to an icon placed in the criterion area, and displaying in the result area one or more icons, each corresponding to a file of the file set, containing part of the search criterion.

According to one embodiment, icons placed side by side in the criterion area define a search criterion combining, with the Boolean OR operator, identifiers of the files corresponding to the icons placed side by side, and/or icons stacked in the search criterion area define a search criterion combining, with the Boolean AND operator, a data item of each of the files corresponding to the stacked icons, and/or an icon placed in an exclusion area of the criterion area defines a search criterion in which a data item of the file corresponding to the icon present in the exclusion area is associated with the Boolean NOT operator.

According to one embodiment, the file icons displayed in the result area are marked depending on the position of the corresponding icon placed in the criterion area.

According to one embodiment, the placement of an icon in the criterion area triggers the execution of a program identified in a field present in the file corresponding to the icon placed in the criterion area.

According to one embodiment, the icon placed in the criterion area is a file containing a search criterion, and a field of the file designates a program whose execution places one or more file icons in the criterion area, like they were in the criterion area at a time the search criterion was saved, and/or the program triggers a search through a search engine accessible on the internet based on keywords entered in an input window.

Some embodiments also relate to a system comprising a display and a control unit, and configured to implement the method defined above.

Some embodiments also relate to a recording medium readable by a computer, storing instructions of a program executable by the computer in order to implement the method defined above.

Exemplary embodiments of the present invention will be described below in relation with, but not limited to, the following figures, in which.

Figure 1:
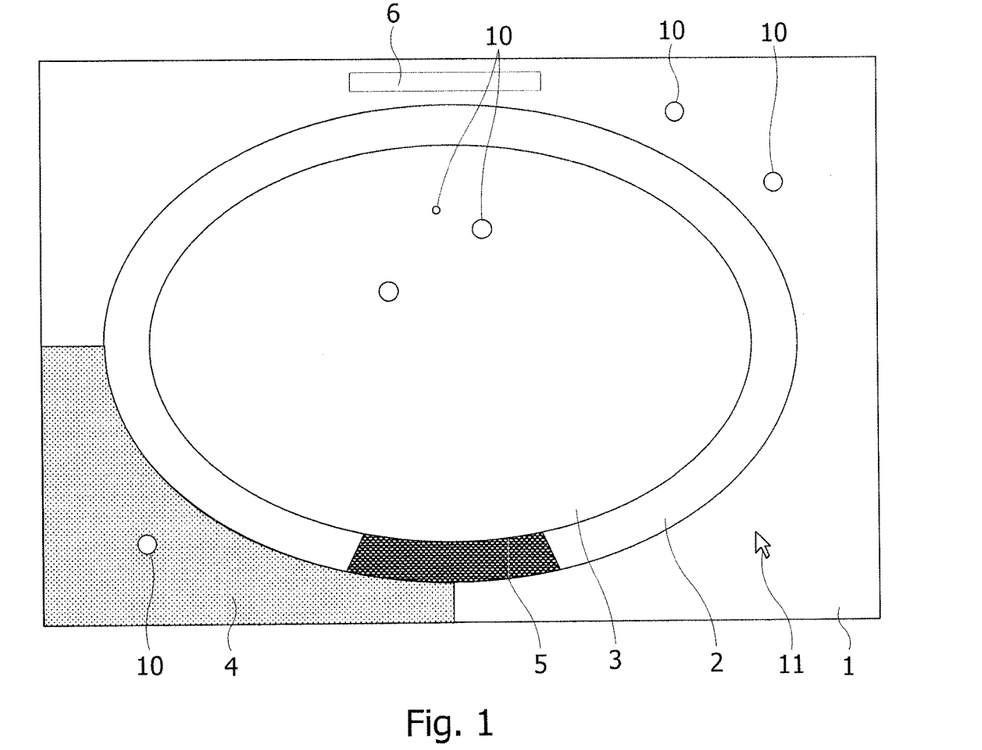
FIG. 1 represents a graphical interface for managing a file set, according to one embodiment.

FIG. 1 represents a graphical interface for managing a file set, according to one embodiment. The graphical interface is susceptible of being displayed on a computer screen. Hereunder, the term "file" stands for a data set organized in a sequential manner with a start and an end, and more generally, a representation of a document or of one or more data items that may be stored remotely or formed on request on-the-fly, and which may be read-only accessible. The file set may form a relational file database. According to one embodiment, the graphical interface comprises:

a favorite files area 1,
a criterion area 2 for defining search criteria,
a result area 3 in which the search results 3 are displayed,
a reference area 4 for defining reference links between a new file and other files present in the file set, and
a field for entering search keywords 6.

The area 2 comprises a zone for defining exclusion criteria 5 implementing the NOT Boolean operator in a combination of several search criteria. The area 4 enables selection of files from the file set that are targets of reference links to be inserted by default into a new file to be created. The input field 6 allows the user to insert individual words or groups of words as keywords. The words entered may comprise wildcard characters. The other areas 1 to 5 may show files in the form of icons 10. Here the "icon" refers to a graphical symbol that may be moved in the image displayed by the graphical interface by means of a pointer 11, for example by actions such as drag-and-drop using a pointing device such as a mouse. Each of the file icons 10 may be associated with a name of the corresponding file or merely consist of this name.

Figure 2:
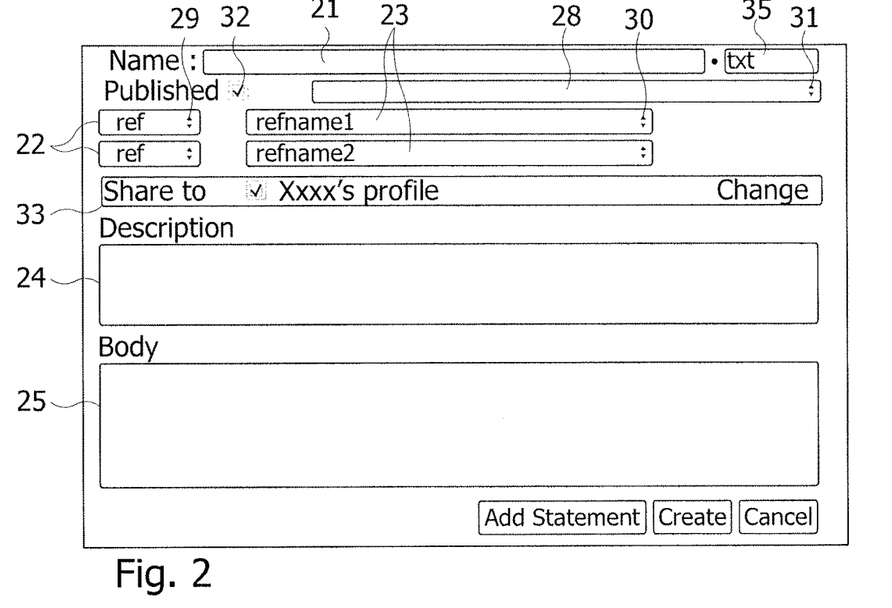
FIGS. 2 and 3 represent a window displayed when activating a command for creating a file from the graphical interface.
Figure 3:
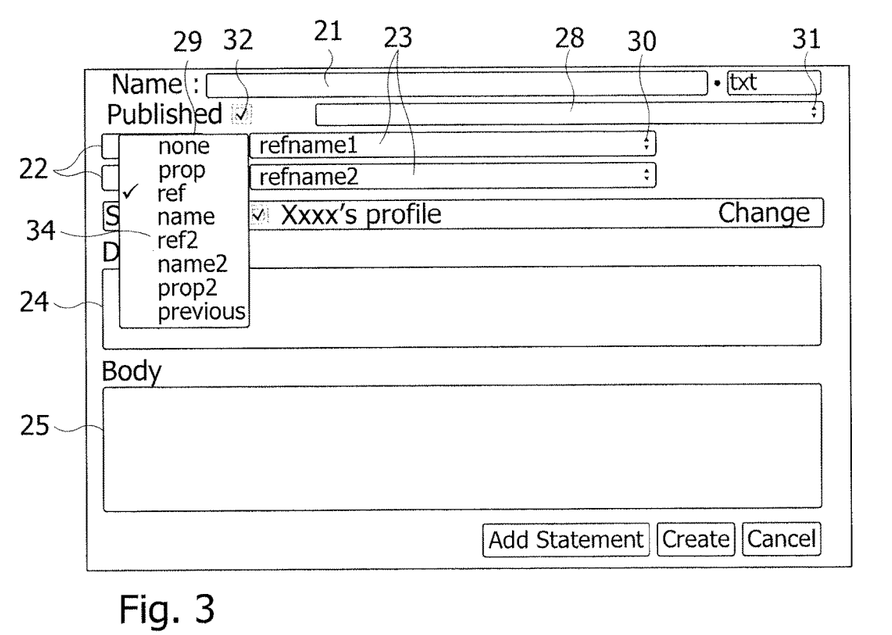

To create a new file in the file set, the user may select icons of files to which the new file should be linked, by placing these icons in the area 4. Then, the user activates a file creation command button. This action displays a file creation window in which a reference link creation line is displayed, for linking to each file of the file set having an icon present in the area 4. FIG. 2 represents an exemplary file creation window. The file creation window comprises a name field 21 in which the user may specify a name for the new file to be created. The file creation window also comprises pre-completed reference link property fields "ref" 22, 23 containing the names of the files whose icons are in the area 4. The file creation window comprises an "Add Statement" command button used to add additional property fields (22, 23) in the new file, and to insert attribute values for each field inserted, these fields being included into the new file in the form of metadata. The file creation window also comprises an input area 24 for adding descriptive information in the new file, and a content input area 25 for inserting content information into the new file. Each property field 22, 23 displayed in the file creation window comprises a field-type 22 indicated by a label and one or more attributes to be completed or that are pre-completed. Arrows 29 displayed in the frame indicating the field-type 22 are used to display a window for selecting a field-type 31 (FIG. 3). Therefore, among the possible field-types, it is possible to create in particular:

property fields "prop" associating a property label to be entered with a property value, reference fields "ref", each allowing a link to be established between the new file and a file existing in the file set, name fields "name", each allowing another name to be defined for the new file, double reference fields "ref2", each establishing a reference link between two files existing in the file set, double property fields "prop2" allowing a new property to be assigned to a file existing in the file set, double name fields "name2", each allowing another name to be assigned to a file existing in the file set, previous fields "previous", each allowing a specific reference link to be established with a previous version of the new file, existing in the file set.

When a "ref", "previous" or "ref2" field is selected, the associated value attribute 23 may be chosen among the names of the files having an icon in the favorite files area 1, or the files located in a directory indicated in a field 28. The list of these files can be displayed using an arrow 30 displayed in name input frame 23. The field 28 designates the target storage area or directory of the file to be created. The name of the directory displayed in the field 28 can be modified using an arrow 31 displayed in the field 28. The initial value of the field 28 includes a default destination chosen in advance by the user. A check box 32 is used to indicate whether or not the file to be created is intended to be public. The system will check that the created file is properly stored in a public storage area if it should be public, and in a private storage area otherwise. A check box 33 is used to choose whether the new file is accessible to another designated user. This other user may be designated by placing an icon corresponding to a profile file of this other user in the reference area 4. A "Change" button is used to select another storage location for the file to be shared with this user. Indeed, the user of the interface may have first selected a default location (field 28) that is not shared with this other user. Therefore, the described interface avoids sharing with a new user previously published contents that are not intended for him.

The creation of a file may be canceled using a "Cancel" command button. The confirmation through a "Create" command button of the information displayed in the file creation window causes the new file containing the information specified in the window of FIG. 2 to be inserted into the file set. The type of the new file may be chosen by selecting a file extension in a frame 35 present in the file creation window. By selecting a file extension such as "txt", "doc", "pdf", "xls", "exe", it is possible to define in particular the way the fields defined in the creation window are inserted in the form of metadata and encapsulated in the new file. Therefore, the new file created may be a text file "txt" comprising metadata delimited in the file by tags, wherein the metadata may include the reference links to other files, the file name, the properties, the description and the content, as specified by the user. According to one embodiment, the created file also comprises identification metadata including a unique identifier, generated when creating the file. The reference metadata contains the identifier or an item of information used to determine the identifier of each file contained in a reference field "ref".

The file creation window may also be displayed if the user activates a command button for downloading a file or if the user moves a file icon present in the result area 3 towards the favorites area 1, and if the corresponding file is not already included in the file set. The activation of the download command button displays a file selection window on a local or remote storage unit, i.e. accessible via one or more data transmission networks. When the user selects a file or moves a file present in the result area 3 to the favorites area 1, a file creation window appears in which the name field is pre-completed with the name of the selected file. The field 24 is displayed to enable a description to be added in the new file. However, the field 25 is not displayed in the file creation window as it corresponds to the content of the selected file. As above for the creation of a new file, one or more "ref" reference link fields are pre-completed with the name of each of the files having an icon in the reference area 4. The identifier, reference and other properties fields are inserted into the downloaded file in a non-destructive manner, i.e. without affecting the properties of the file, in particular so that it can be opened, displayed, printed, executed, etc., by the same tools as before this insertion. A check box 36 ("Add ref"), checked by default, can be unchecked to prevent metadata, comprising in particular an identifier of the file and references to other files of the file set, from being inserted into the file. This possibility is used in the event that the file already comprises an identifier, or to publish the file without any identifier.

Thanks to the download command, it may also be possible to create a new file from an existing file already present in the file set, by adding thereto, or removing therefrom fields such as reference, link and property fields or by modifying the value of fields present in the existing file. When generating the new modified file, a "previous" field can be automatically added to contain the identifier of the existing file as a reference to a previous version.

If the user moves a file icon present in the result area 3 to the favorites area 1 and if the corresponding file is not already included in the file set, a new file can be inserted into the file set, without displaying the download window. The new file inserted then contains the body of the file (or an address such as an URL of the file) whose icon was moved to the favorites area 1, a unique identifier and a reference link to each of the files having an icon present in the reference area 4.

Examples of files F1 to F5 of the file set are presented in Appendix I, providing metadata content of each of the files F1 to F5. Each of the files F1 to F5 includes a protected section delimited by the opening "/*" and closing "*/" tags and containing the metadata of the file F1. Each metadata item is located and delimited between the keywords "kx" and "xk". The metadata of the files F1 to F5 comprises a file identification item starting with the keyword "self", and reference metadata starting with the keyword "ref". Each of the identification and reference metadata includes a unique character string identifying the file (for the identification metadata), or identifying a file to which it is linked (for the reference metadata). In the example in Appendix I, each of the identifiers of the files F1 to F5 is of bubble babble type and starts and ends with the letter "x". Bubble babble is an encoding method used to represent binary information in the form of always pronounceable character strings as they are built in the form of five-letter words each comprising three consonants alternating with two vowels. References to other files start and end with the letter "r". Therefore, an identifier may be deduced from a reference merely by replacing the first and last letters "r" of the identifier with the letter "x", and vice versa. It will be understood that other means for distinguishing a file identifier from a reference to another file can be devised, in particular according to the format used to define the identifiers of the files of the file set.

The steps of creating or inserting a file, as described above, are used to build a file database in which the data is distributed in files each having their own identifier and which can reference, by their identifiers, other files of the file database. The formation of such a file database does not require a data structure to be defined in advance, each user being able to add links and properties to existing files thanks in particular to the "name2", "ref2", "prop2" fields.

According to one embodiment, the identifier of each file of the file set is generated for example randomly or by incrementing a counter, so that two different files have different identifiers.

According to another embodiment, the identifier of each file of the file set is determined by a fingerprint and/or signature calculation applied to the metadata and body of the file, excepting the identifier of the file. Therefore, the identifier of each file has a value that depends on each of the bits of the file excluding the bits of the identifier, so that if a bit of the file is modified, the identifier of the file will also be modified. The fingerprint calculation may be carried out by a hash function such as sha-1, sha-256, sha-384, sha-512 and md5. The calculation of the fingerprint of a file of the file set may also be performed by a lossless data compression function, such that the fingerprint calculation is a reversible operation. The fingerprint calculation may also be performed by a lossy data compression function, but making the reconstitution of a data block possible from its fingerprint. The calculation function may for example combine a bitmap image transform function, and a lossy bitmap image compression function. A data block may be reconstructed from its fingerprint by decompressing the image, and by converting the image into alphanumeric characters by an OCR function. The fingerprint inserted as a file identifier may be encoded in different formats such as hexadecimal, base 64 or bubble babble (cf. Appendix I). In the hexadecimal format, the fingerprints are longer, since they use only the digits and the letters from A to F. The "b64" format uses all the characters, in both upper and lower case.

According to another embodiment, the identifier of each file of the file set is a signature generated by an asymmetric cryptographic calculation, using a private key of a public/private key pair, applied to each of the bits of the file excluding the bits of the identifier. The signature may also be generated by applying the cryptographic calculation to a fingerprint of the file obtained as specified above, excluding the bits of the identifier. The signature calculation may be RSA (Rivest, Shamir, Adleman) or DSA (Digital Signature Algorithm).

If a new file is generated by modifying an existing file in the file set, its identifier obtained through its fingerprint or its signature is then different from that of the existing file. If one or more copies are generated from a file of the file set, these copies will be seen as one and the same file, since they contain a same identifier.

Figure 5:
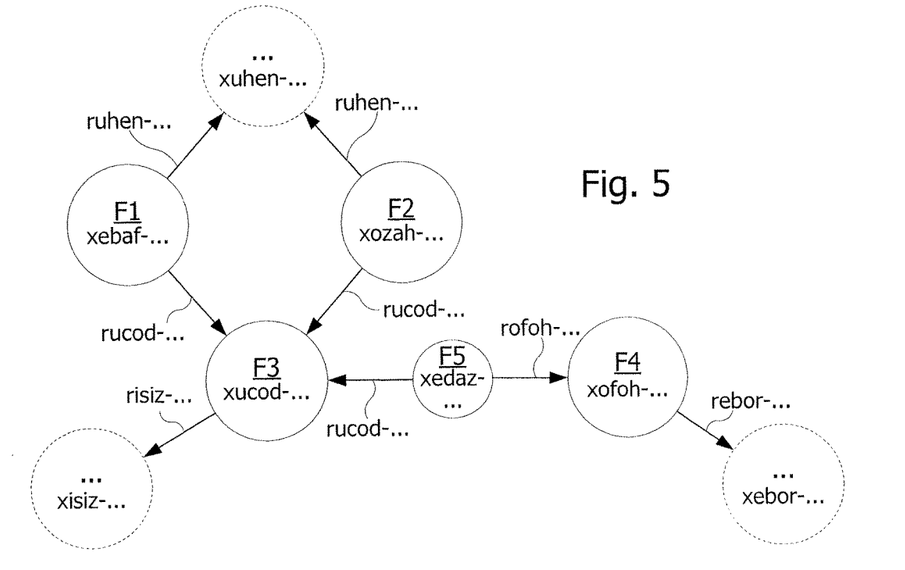
FIG. 5 represents a file set and links between the files of the set, obtained by the graphical interface.

FIG. 5 represents all the files F1 to F5 and the reference links defined therebetween. The values of the reference links start and end with the letter "r" and are introduced by the keyword "ref". The reference links associating two reference fingerprints (file F5) are introduced by the keyword "ref2". The files F1 and F2 refer to the file F3 and to another file identified by the fingerprint:

"xuhen-zakid- . . . -raxux".

The file F3 refers to another file identified by the fingerprint:
"xisiz-kynov- . . . -zyxyx"

The file F4 refers to another file identified by the fingerprint:
"xebor-movab- . . . -muxax"

The file F5 is a link block establishing a reference link between the files F3 and F4. The files F1 to F5 comprise a "name" metadata corresponding to the field 21, enabling a name to be allocated to the file and to be specified in the body of the file. The file F3 comprises a "prop" metadata used to define a property of the file, such metadata being of the "description" type in the example and associated with a value attribute.

To search for all the files linked to a file, i.e. containing the identifier of the latter as a reference, the icon of the file is simply placed in the criterion area 2. This operation triggers a search for all the files in the file set containing the identifier of the file whose icon is placed in the criterion area 2. Actually, the icon of a file represents the identifier of the file and thus all the known copies of this file. A set of files linked to the file having an icon placed in the criterion area 2 appears in the form of icons 10 in the result area 3 (FIG. 1).

Figure 6:
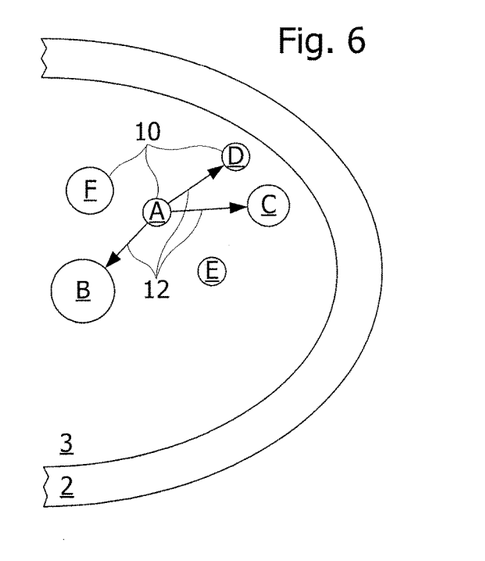
FIG. 6 represents file icons and links between these icons.

If one of the files of the result area 3 is selected (for example by means of a cursor placed on the icon of the file), arrows may be displayed. These arrows identify reference links existing between the file thus selected and the files corresponding to the other icons present in the result area 3 or other files present or not in the list of search results. The non-displayed icons of the files referenced by the selected file are then added in the result area 3. FIG. 6 represents icons 10 named A, B, C, D, E, F displayed in the result area 3. The user has designated the icon A. Arrows 12 from the icon A and linking to the icons B, C, D then appear. The arrows 12 indicate that the file corresponding to the icon A contains links referencing the files corresponding to the icons B, C, D. The arrows 12 thus displayed may have different appearances (for example different colors) to distinguish the reference-type links ("ref" or "ref2" fields), or previous-type ("previous") or author-type ("kx.author") fields if another user is referenced. By default, it may be devised to not display in the result area 3 the previous versions of a file contained in the search result list. When another icon is designated in the result area 3, the previously displayed arrows are hidden, and, where applicable, new arrows are displayed if the designated icon includes reference links.

According to an embodiment, the icons displayed in the result area 3 are displayed in varying sizes depending on criteria such as the creation date of the corresponding file, and/or the last creation date of a file containing a reference link to the corresponding file, and/or the number of files referencing the corresponding file. Furthermore, if the number of files found, corresponding to the criterion defined by the criterion area 2, is higher than a given number, for example 10, the files found may be sorted according to the creation date and/or number of reference links designating the file, and spread over several pages. The first page contains the most recent or most recently referenced or most referenced files. The icons of the files on the first page are displayed first in the result area 3. The icons of the files found, belonging to a next or previous page may be overwritten in the result area 3, for example using a pagination key. A number 41 (FIG. 7) displayed in the icon in the criterion area 2 may indicate the number of the results page displayed in the result area 3.

The criterion area 2 may be used to define more complex search criteria. Thus, several file icons may be placed side by side in the criterion area 2 for displaying in the result area 3 all the files linked to the files corresponding to one or the other of the icons present in the criterion area 2. This arrangement implements a Boolean OR operator for search criteria combinations.

According to an embodiment, the icons of the found files, displayed in the result area 3, are marked depending on the position of the corresponding criterion icon in the criterion area 2. For example, the criterion area 2 is subdivided into several regions, and each region is associated with a color. The criterion icons and the corresponding result icons are displayed with the same color. It is thus possible to view which criterion icon a result icon corresponds to, when several criteria are combined using the OR Boolean operator.

Figure 7:
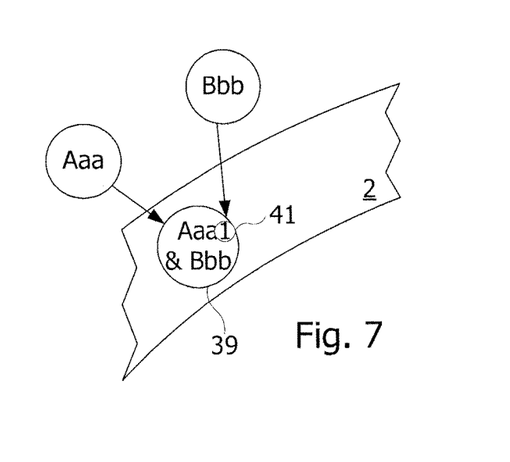
FIG. 7 shows the construction of a search request combining two criteria using the AND Boolean operator, FIG. 8 schematically represents a system implemented by a method for generating and using a file set, according to one embodiment.

By stacking two or more file icons in the criterion area 2, the icons of only the files simultaneously linked to the files whose icons are stacked in the criterion area 2 are displayed in the result area 3. On FIG. 7 showing a portion of the criterion area 2, the user has stacked two file icons named "Aaa" and "Bbb" in the criterion area 2. This action generates in the criterion area 2 an icon 39 having the name "Aaa & Bbb" associating the names of the files whose icons have been stacked. This arrangement implements a Boolean AND operator for search criteria combinations.

If a file icon 10 is placed in the exclusion criterion area 5, all the file icons present in the criterion area 2 and corresponding to files linked to the file appearing in the exclusion area 5 are removed from the result area 3. It is thus possible to implement a Boolean NOT operator for search criteria combinations. It will be understood that several icons may be stacked or placed side by side in the exclusion area 5 to combine several exclusion criteria using the AND or OR Boolean operator.

The graphical interface thus offers simple and intuitive means of defining search criteria combining simple or complex criteria with AND, OR and NOT Boolean operators.

According to an embodiment, a command button of the graphical interface allows the current search criterion as defined in the criterion area 2 to be saved. This action inserts into the file set a new file defining a search criterion. This operation may also trigger the adding of an icon in the favorites area 1. The criterion icons may be customized, for example with a particular color. The criterion saving operation is performed like for any other file of the file set, but without inserting as references into the new file the identifiers of the files whose icons are in the reference area 4. An example of a criterion file named "Demo Save Search" is given in Appendix II. This file contains property fields "prop", each defining a property "kx.search" corresponding to one of the criteria combined by an OR operator. A "kx.search" field contains the identifier of a file of the file set as a value attribute, and the name of the file as a name attribute. In the case of a criterion involving the AND operator, the value of the "kx.search" field contains the identifiers of the corresponding files separated by the character "&". Similarly, the name of the field contains the names of the files thus combined, separated by the character "&". An exclusion criterion is stored in the same way in a property field defining a property "kx.negation_search" comprising name and value attributes containing the name and the identifier of the file corresponding to the icon placed in the exclusion area 5. Each criterion field may also contain a position attribute the value of which is the x, y position coordinates of the corresponding icon in the criterion area 2, at the time of saving the search criterion.

A criterion file also contains a "ref" reference field (equal to rodeb-voset- . . . in the example given in Appendix II) referring to a predefined system file representing the saved "search" concept. Thus, all the saved search files can be found by placing the icon of the "search" file in the criterion area 2.

A search can be relaunched by merely placing the icon of a criteria file in the criterion area 2. This action triggers the execution of a program for each field "kx.search" and "kx.negation_search". This program places in the criterion area 2 or exclusion area 5 an icon having the name corresponding to the name attribute of the field "kx.search" or "kx.negation_search". This program contributes to the creation of a search criterion by adding to a criterion being created the identifier or the combination of identifiers indicated in the field "kx.search" or "kx.negation_search" associated with the OR or NOT operator. Thanks to the position attribute x,y contained in the field, this action may result in placing the icons back in their respective positions in the criterion area 2 or the exclusion area 5, at the time of saving the search criterion. The saving of criteria may also enable complex combinations of criteria to be created by placing several criteria file icons in the criterion area 2, and by selecting an option of the interface provided for that purpose.

It is also possible to perform file searches using keywords, not only in the file set, but also outside thereof. For this purpose, one or more keywords can be entered in the input window 6. If icons are also placed in the criterion area 2, entering keywords in the window 6 filters the search results displayed in the result area 3. This filtering involves displaying in the result area 3 only the icons of files comprising the keywords specified in the window 6 in their "name" or "description" fields or in their body.

The icons displayed in the result area 3 can also be displayed in the form of a list, by means of a command button provided for this purpose in the graphical interface.

More generally, it is possible to define behavior property fields "prop" (for example "kx.behavior"), like "kx.search", for triggering the execution of a specific program. For example, such a program may run a search through a search engine accessible on the Internet, based on keywords entered by the user in the input field 6 of the graphical interface. In this case, the icons displayed in the result area 3 represent URLs of web pages accessible on the Internet. Moving one of these icons from the area 3 to the favorites area 1 has the effect of inserting into the file set a file containing, in particular, an identifier and a property field "prop" containing the value of the URL of the corresponding icon, this field being capable of triggering a program displaying in a browser the web page corresponding to the URL. For this purpose, the window shown in FIG. 4 can be displayed. Thus, the file inserted into the file set may also contain reference link fields referring to the files having an icon present in the reference area 4 of the graphical interface.

Before executing such a program, in particular if the latter is not stored in a secure space, the program may include, like the files of the file set, an identifier that is checked when it is launched, by an integrity checking procedure described below.

According to an embodiment, the possibility is provided for selecting several icons displayed in any of the areas 1 to 5, and for moving them to another displayed so-called "target" icon for creating reference links between each of the files corresponding to the selected and moved icons and the file corresponding to the target icon. The double link reference links "ref2" can be created in a single file or in separate files. A selection performed in the result area 3 may concern all the displayed icons or all the results of the current search, whether or not displayed in the form of an icon.

Furthermore, the content of the files corresponding to the icons displayed in the result area 3 or the favorites area 1 can be viewed (or executed) according to the type of file, for example by double-clicking the icon. This action may trigger a file integrity check procedure. According to an embodiment, this procedure involves:

searching for the identifier of the file in the file itself, by means of a tag ("kx.self" or bubble babble code starting and ending with the letter "x" in the example of Appendix I or II), generating a modified file by removing the identifier found in the file, calculating a digital fingerprint by applying a fingerprint calculation function to the modified file, the calculated fingerprint having a value that depends on each of the bits of the modified file, and checking the identifier found in the file by comparing it with the calculated fingerprint.

It shall be noted that the fingerprint calculation may be carried out directly on the unmodified file, by applying the fingerprint calculation function to the bits of the file except for the bits of the file identifier.

Therefore, the file integrity check especially involves calculating the fingerprint of the file without taking account of the bits of the file identifier. If the file identifier does not correspond (for example is not identical) to the calculated fingerprint, a copy of the file (having the same identifier) may be searched for, until a copy is found that successfully passes the integrity check. If the file identifier is a signature, the integrity check of the file then comprises the calculation of the signature from the file, excluding the bits of the file identifier, and the comparison of the calculated signature with the identifier of the file. It shall also be noted that each file may comprise a "kx.signer" metadata item (cf. Appendix II) referring to the file containing the integrity calculation program (fingerprint or signature). This reference is then used to determine the program to be executed to calculate the fingerprint or the signature of the file, the fingerprint or the signature thus calculated then being compared with the identifier of the file. If no unaltered copy of the requested file is found, the file is not displayed or executed. An error message may then be displayed to indicate to the user that no unaltered version of the file to be displayed or to be executed was found. In the opposite case, the content of the file is displayed or executed.

An icon may be deleted from the favorites area 1 for example by moving it to an icon representing a trash bin. The effect of this operation may merely be to create a new file in the file set, saving the user's action of deleting the file, this new file comprising a reference link to the deleted file. When a search is done, the files thus marked as deleted may be removed from the list of search results.

According to an embodiment, the files of the file set are stored locally in a storage unit of the user's computer or on remote storage spaces that only the user can access. In this case, the searches are executed locally by the user's computer in the storage spaces (local and/or remote directories) designated by the user.

According to an embodiment, the file set is shared between several users. Each search in the file set is executed locally by the user's computer that has launched the search, in the storage spaces (local and/or remote directories) designated and accessible by the user.

Figure 8:
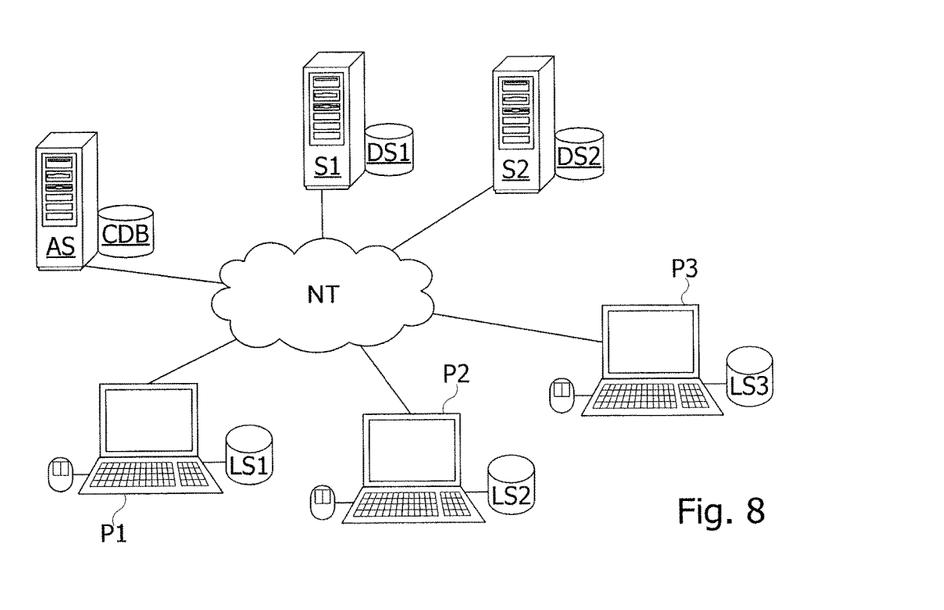

According to another embodiment, the searches in the file set are executed by a remote server to which the users authenticate to gain access to the file set. FIG. 8 represents a system in which the management method may be implemented. The system comprises a file server AS, user computers P1, P2, P3, and servers S1, S2, the servers and computers being interconnected by one or more networks NT that may be private and/or public. Each of the computers comprises a screen to display the graphical interface as represented in FIG. 1, one or more control units such as a keyboard and a mouse, in particular to enter keywords and move icons 10 in the graphical interface. The server AS comprises or is connected to a local storage unit CDB in which part of the files of the file set is stored. The computers P1, P2, P3 may comprise local storage units LS1, LS2, LS3 which may also store part of the files of the file set. The servers S1, S2 may also comprise, or grant access to storage units DS1, DS2 which may store files of the file set or files searched for as previously described. It may also be provided to activate a synchronization function on each of the computers P1, P2, P3 to manage a local copy of the remote storage units DS1, DS2 in the local storage units LS1, LS2, LS3.

Users may authenticate, for example, through a connection window to the server AS that locally stores user identification and authentication data. The users' identification and authentication data comprises a user profile file stored in the file set and containing in particular the name of the user, and a unique identifier that may be generated by a fingerprint or signature calculation based on the content of the profile file. This profile file may be generated by the server AS at the time of registering the user on the server AS. The user's identifier may be systematically inserted into all the files that the user inserts into the file set, so as to be able to identify the origin of a file of the file set, in particular when the file is placed in a public storage area (when the check box 32 is checked). In the example in Appendix II, the file comprises a property field "kx.author", the value attribute of which is a reference to the identifier of a user profile file. Therefore, the author of a file of the file set may be identified by a link to a user profile file. The server AS may also manage user access rights in the different storage spaces of the files of the file set, The server AS receives and processes the search requests issued by the users, taking into account the storage spaces accessible by the user that issues the search request.

In particular, in order to speed up the processing of search requests, the server AS may create and update a table storing the identifiers of the files of the file set, and associating with each of these identifiers, the values of the links to other files, each associated with a type of link (reference, previous version, visibility by other users, author), the directories where copies of the file are stored, etc. In this way, searches can be executed directly in the table, without searching for a file identifier in all the files of the file set stored locally by the server AS or in remote storage spaces to which the user who issued the search request has an access right.

Figure 4:
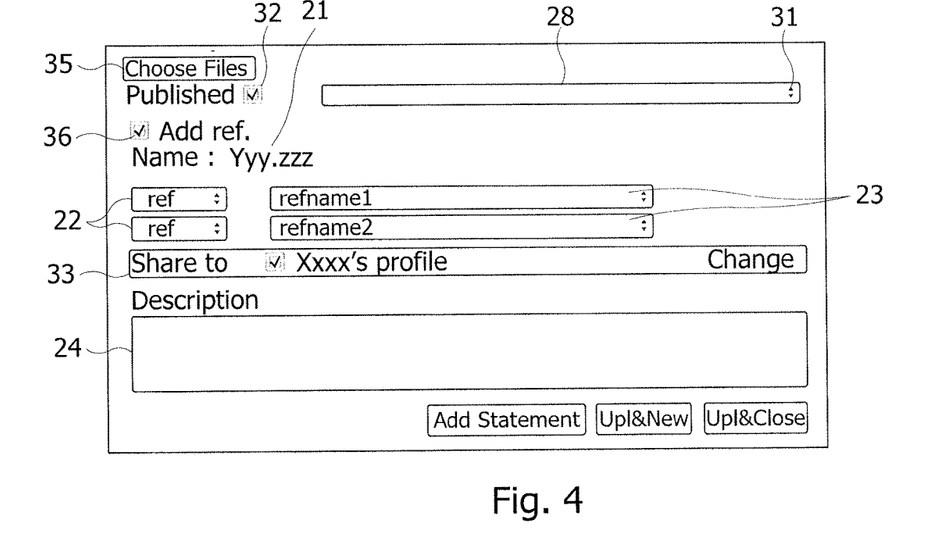
FIG. 4 represents a window displayed when activating a command for downloading a file from the graphical interface.

It may also be possible when inserting a file into the file set to specify that the file is accessible to a designated user, thanks to a field 33 (FIGS. 2 and 4). Use of the field 33 causes the creation in the file of a visibility property field "prop" named "kx.visible_by", containing the identifier of the user to whom file access is granted. It is possible to allocate such an access right after inserting the file into the file set by placing the icon of the file present in the favorites area 1 on the profile icon of the user to whom access right is to be granted. This action creates a specific file having its own identifier, a "kx.author" property field containing the identifier of the user who performs the action, and a visibility "prop2" property field "kx.visible_by", containing the identifier of the user to whom access right is granted, and the identifier of the file affected by the access right. The existence of such a file is also taken into account when executing a search to determine the files among which the search should be performed or if a file found during a search may be among the results displayed on the result area 3 for the user who issued the search request.

The method for managing a file set as previously described may be used in particular to define organizational concepts or keywords, such as "processed", "to be processed", "to be validated", "validated", "read", "not read", "urgent", by inserting into the file set a file whose name corresponds to the title of the concept. These concepts may then be used to mark work files of the file set, such as files containing a message or a program, by creating reference link files such as F5 between the concept files and the work files. A concept may be separated from a work file by deleting the link file between the work file and the concept file or by adding a link to a concept that renders another concept inoperative such as "validated" compared to "to be validated". Each user may thus create their own concept files or they may be created as needed for several users for example by a supervising user. The search function described above may be used to search for all the files of the file set linked to one or more concepts. Each user may thus define their own data structures, share them with other users, and easily change them, while remaining assured of the integrity of the existing data.

For example, in a messaging or software development system, a message or a file that should be processed by several users may be associated with a "to be processed" concept allocated to a user supervising tasks. A user may thus search for all the files he has to process by placing the icon of the "to be processed" concept file in the criterion area 2. When the message is processed by a user, a link file to a "processed" concept file of the user can be created. To search for the files not processed for a user, the icon of the "to be processed" concept file is simply placed in the criterion area 2, and the icon of the "processed" concept file of the user is placed in the exclusion area 5. To search for the files processed by a user, the icon of the "processed" concept file of the user is simply placed in the criterion area 2.

The management method previously described may also be used to date documents, by creating a date file containing a date and a current time field and the identifier of the document to be dated.

It will be understood by those skilled in the art that the present invention is susceptible of various alternative embodiments and various applications. In particular, the invention is not limited to the applications described above but may apply to any other application involving a database.

The embodiments described above are purely illustrative and may be modified in the framework defined by the appended claims.

Furthermore, the various embodiments of a method for searching for data described above, form a standalone invention that may be implemented independently of the steps of inserting a file into a file set. This invention is a method for searching for data in a file set, comprising steps of: displaying in a graphical interface a criterion area, and a result area, activating a search for files in the file set upon placing in the search criterion area an icon corresponding to a file of the file set, the search using as search criterion data contained in each file corresponding to an icon placed in the criterion area, and displaying in the result area one or more icons, each corresponding to a file of the file set, containing the data used as search criterion.

It shall be noted that it is not necessary for the search criterion to be the identifier of a file having an icon placed in the criterion area 2. It is merely important that the criterion be data previously designated in the file.

According to an embodiment, icons 10 placed side by side in the criterion area 2 define a search criterion combining, with the Boolean OR operator, identifiers of the files corresponding to the icons placed side by side, and/or icons stacked in the search criterion area define a search criterion combining, with the Boolean AND operator, data of each of the files corresponding to the stacked icons, and/or an icon placed in an exclusion area 5 of the criterion area defines a search criterion in which data of the file corresponding to the icon present in the exclusion area, is associated with the Boolean NOT operator.

According to an embodiment, the file icons 10 displayed in the result area 3 are marked depending on the position of the corresponding icon placed in the criterion area 2.

According to an embodiment, placing an icon 10 in the criterion area 2 triggers the execution of a program identified in a field present in the file corresponding to the icon placed in the criterion area. The icon placed in the criterion area 2 may be a file containing a search criterion, and a field of the file may designate a program the execution of which places one or more file icons in the criterion area, like they were in the criterion area at a time the search criterion was saved, and/or the program may trigger a search by a search engine accessible on the Internet based on keywords entered in an input window.

APPENDIX I (FORMING AN INTEGRAL PART OF THE SPECIFICATION)

---

File F1
/*
kx self xebaf-zuzat-zocut-telyc-bycyn-talyd-nukak-senom-lufyr-miPaz-gulab-
    kacep-kilid-pobin-bekub-tyvib-koxix xk
kx name "F1" xk
kx ref "ruhen-zakid-kakas-mased-hedot-faded-tamap-rulem-porib-cihit-vicif-
    fazuh-kisit-tycat-gypaf-dymag-raxur" xk
kx ref "rucod-pibev-mehog-puhuc-vypiz-donom-bocet-vymyc-retyz-gyfam-
    damul-hanud-dikav-fulyg-cuvez-ligyb-hexor" xk
*/
File F2
/*
kx self xozah-lydeg-vymap-nopop-decec-zuvod-zufof-pikav-halut-dycyt-mogit
    -kofer-bipaf-nimib-benef-mefeh-nyxux xk -continued

```
kx name "F2" xk
kx ref "ruhen-zakid-kakas-mased-hedot-faded-tamap-rulem-
    porib-cihit-vicif-
    fazuh-kisit-tycat-gypaf-dymag-raxur" xk
kx ref "rucod-pibev-mehog-puhuc-vypiz-donom-bocet-vymyc-
    retyz-gyfam-
    damul-hanud-dikav-fulyg-cuvez-ligyb-hexor" xk
*/
File F3
/*
kx self xucod-pibev-mehog-puhuc-vypiz-donom-bocet-vymyc-
    retyz-gyfam-
    damul-hanud-dikav-fulyg-cuvez-ligyb-hexox xk
kx name "F3" xk
kx ref "risiz-kynov-mogec-tycas-livaf-hytov-cyzar-hofed-nobyl-
    zuvyz-mifav-
    kiteb-nodun-mipyr-bilac-ceheh-zyxyr" xk
kx prop "description", "xx xxxxx xx xx xxxx" xk
*/
File F4
/*
kx self xofoh-hafuf-mybyg-fagas-fidec-cufov-malaf-lalof-bizyk-
    kapig-nyben-
    bymyb-ditug-zarud-hobaf-hikud-zixox xk
kx name "F4" xk
kx ref "rebor-movab-vyzif-tisaz-hurev-vuzys-vohyk-kyfaz-pehih-
    dygik-zukuv-
    zulek-fobyk-vedug-banal-sylin-muxar" xk
*/
File F5
/*
kx self xedaz-harov-tifav-biguf-cobuh-pivyz-punyg-duguk-sisek-
    lohaz-gikot-
    rymoc-kirac-pytim-pimip-suhin-maxux xk
kx name "F5" xk
kx ref "ruriv-kypeh-sycir-rysyl-cadab-sapon-dynoz-fahan-zafiz-
    lenec-camym-
    tyrat-nihor-rugek-ryfuf-luged-hexyr" xk
kx ref2 rucod-pibev-mehog-puhuc-vypiz-donom-bocet-vymyc-
    retyz-gyfam-
    damul-hanud-dikav-fulyg-cuvez-ligyb-hexor,"rofoh-hafuf-
    mybyg-fagas-
    fidec-cufov-malaf-lalof-bizyk-kapig-nyben-bymyb-ditug-zarud-
    hobaf-
    hikud-zixor" xk
*/
```

APPENDIX II (FORMING AN INTEGRAL PART OF THE SPECIFICATION)

Save Search Demo File

```
/*
kx self xiror-banuv-myvab-butol-fylim-pahir-dihaz-nicek-sitec-rilor-bogom-
    nazeh-sytig-ludal-mukab-nalal-vexax , {main} xk
kx name "Demo Save Search" , {main} xk
kx ref "rodeb-voset-tyvaf-vituv-nypad-vozeb-humit-detif-hakuf-tufol-
    vobaz-
    gebuv-fytyv-caniz-sevul-cytuh-hexer" xk
kx prop "kx.search", "{'ContainerID':'30851','Name':'Business
Model Canvas',
    'Value':'ribam-rupil-zomaz-hifod-vuhep-levyg-rizon-voguh-revoh-dirus-
    nagol-nagyt-zupim-debym-codim-kadod-nexir',
    'x':0.18954758190327614,'y':0.2768777614138439}" xk
kx prop "kx.search", "{'ContainerID':'103','Name':'Concept &Mine',
    'Value':'reb
    or-movab-vyzif-tisaz-hurev-vuzys-vohyk-kyfaz-pehih-dygik-zukuv-zul
    ek-fobyk-vedug-banal-sylin-muxa&ubir-fefid-vecul-gysyr-zetor-sicus-m
    oleh-gisaf-vifab-karyc-beras-sitos-kyzub-dafuz-dunyh-vukof-sixir',
    'x':0.7371294851794071,'y':0.20765832106038293}" xk
kx prop "kx.negation_search", "{'ContainerID':'76','Name':'Kx',
    'Value':'rirad-ty
    voh-cydoh-mozah-gazir-sahot-kiped-huguv-vipip-lazor-piryp-cacin-tad
    um-pobug-finaz-pykef-dexer','x':0.4765990639625585,
    'y':0.8718703976435935}" xk
```

-continued

Save Search Demo File

```
kx signer ruzin-tinen-cudib-fudab-poruh-salup-letin-sehoh-poluc-
    bazec-dahyr-
    gogun-rokeh-vusin-fatoz-tymab-fexar , {compatibility} xk
kx prop "kx.author", "rulop-tedub-mykyg-hazok-kogak-filad-tybel-
    kefyr-fugyk-
    lageg-lasip-rityp-mypeg-kicyh-tones-mefuf-daxur" xk
*/
```

The invention claimed is:

1. A method for managing a file set, comprising steps of:
    displaying a graphical interface comprising display areas including a reference area, wherein each file of a file set is displayed in the form of an icon in one of the display areas, and each file of the file set includes a unique identifier identifying the file, and
    processing a command for inserting into the file set a selected pre-existing file which does not belong to the file set, the processing of the insertion command comprising the steps of:
    generating a new file in the file set, from the content of the selected pre-existing file,
    generating a unique identifier identifying the new file, and
    inserting into the new file the generated unique identifier and a reference link generated from a file identifier corresponding to each icon located in the reference area.

2. The method according to claim 1, wherein the file identifier and any reference links are inserted into the new file without affecting the way the content of the pre-existing file located in the new file may be used.

3. The method according to claim 1, wherein each file icon displayed in the graphical interface represents all the possible copies of a file having a same identifier, independently of a storage area in which a copy of the file may be stored.

4. The method according to claim 1, comprising a step of inserting into the file set, a link file for linking two files, when two file icons present in a favorite files area of the display areas are stacked, the link file including a unique identifier identifying the link file and a double reference link including the identifier of each file corresponding to the two stacked icons.

5. The method according to claim 1, comprising steps of:
    searching for a location for inserting an identifier into the new file, by means of a tag,
    calculating a digital fingerprint by applying a fingerprint calculation function to the new file, the calculated fingerprint having a value based on each of the bits of the new file, and
    inserting the fingerprint at the insertion location found in the new file, the fingerprint serving as an identifier of the new file.

6. The method according to claim 1, wherein the use of a file of the file set is preceded by integrity checking steps of:
    calculating a digital fingerprint by applying a fingerprint calculation function to the file to be used, the calculated fingerprint having a value based on each of the bits of the new file except for the bits of the identifier of the file to be used, contained therein, and
    comparing the calculated fingerprint with the identifier of the file to be used, the integrity check of the file to be used being successful if the calculated fingerprint corresponds to the identifier of the file to be used, the use of the file to be used only being authorized if the integrity check of the file to be used was successful.

7. The method according to claim 6, comprising steps of searching for a copy of the file to be used and of checking the integrity of the found file copy, if the integrity check of the file to be used failed.

8. The method according to claim 1, wherein the new file contains an identifier of a profile file assigned to the user who issued the command for inserting the new file into the file set.

9. The method according to claim 1, comprising steps of:
displaying in the graphical interface a criterion area and a result area among the display areas,
activating a search for files in the file set upon placing in the criterion area an icon corresponding to a file of the file set, the search using a search criterion generated from the identifier of each file corresponding to an icon placed in the criterion area, and
displaying in the result area one or more icons, each corresponding to a file of the file set, containing part of the search criterion.

10. The method according to claim 9, wherein:
icons placed side by side in the criterion area define a search criterion combining, with the Boolean OR operator, identifiers of the files corresponding to the icons placed side by side, and/or
icons stacked in the search criterion area define a search criterion combining, with the Boolean AND operator, a data item of each of the files corresponding to the stacked icons, and/or
an icon placed in an exclusion area of the criterion area defines a search criterion in which a data item of the file corresponding to the icon present in the exclusion area is associated with the Boolean NOT operator.

11. The method according to claim 9, wherein the file icons displayed in the result area are marked depending on the position of the corresponding icon placed in the criterion area.

12. The method according to claim 9, wherein the placement of an icon in the criterion area triggers the execution of a program identified in a field present in the file corresponding to the icon placed in the criterion area.

13. The method according to claim 12, wherein:
the icon placed in the criterion area is a file containing a search criterion, and a field of the file designates a program whose execution places one or more file icons in the criterion area, like they were in the criterion area at a time the search criterion was saved, and/or
the program triggers a search through a search engine accessible on the Internet based on keywords entered in an input window.

14. A system comprising a display and a control unit, and configured to implement the method according to claim 1.

15. A recording medium readable by a computer, storing instructions of a program executable by the computer in order to implement the method according to claim 1.

* * * * *